United States Patent
Morizet et al.

(10) Patent No.: US 6,505,102 B2
(45) Date of Patent: Jan. 7, 2003

(54) METHOD AND DEVICE FOR ASSISTANCE WITH THE PILOTING OF AN AIRCRAFT, ESPECIALLY A TRANSPORT AIRPLANE

(75) Inventors: Benoît Morizet, Toulouse; Jean-Sébastien Vial, Colomiers, both of (FR)

(73) Assignee: Airbus France, Toulouse (FR)

(*) Notice: Subject to any disclaimer, the term of this patent is extended or adjusted under 35 U.S.C. 154(b) by 0 days.

(21) Appl. No.: 10/093,927

(22) Filed: Mar. 11, 2002

(65) Prior Publication Data

US 2002/0143439 A1 Oct. 3, 2002

(30) Foreign Application Priority Data

Mar. 27, 2001 (FR) .......................... 01 04083

(51) Int. Cl.[7] .............................. G06F 17/00
(52) U.S. Cl. .................. 701/3; 701/4; 701/18
(58) Field of Search ............... 701/3, 4, 5, 6, 701/7, 8, 9, 11, 16, 18, 201, 207, 208, 211, 212; 73/174

(56) References Cited

U.S. PATENT DOCUMENTS

| | | | |
|---|---|---|---|
| 4,373,184 A | * | 2/1983 | Lambregts .................. 701/18 |
| 6,057,788 A | * | 5/2000 | Briffe et al. .................. 701/4 |
| 6,112,141 A | | 8/2000 | Briffe et al. |
| 6,336,835 B1 | * | 4/2002 | Henderson .................. 701/4 |
| 6,366,836 B1 | * | 4/2002 | Johnson .................. 701/4 |

FOREIGN PATENT DOCUMENTS

| | | |
|---|---|---|
| FR | 2689231 | 10/1993 |
| FR | 2744525 | 8/1997 |
| WO | 0120583 | 3/2001 |

* cited by examiner

Primary Examiner—Richard M. Camby
(74) Attorney, Agent, or Firm—Stevens, Davis, Mileer & Mosher, LLP

(57) ABSTRACT

The method provides for an information presentation (IF1) to be presented on a visual-display screen (5), the information representing at least one vertical plane along a theoretical flight trajectory of the aircraft, and which includes an axis system (8, 9), in which a y-axis (8) is graduated in altitude, and an x-axis (9) is graduated in distance from the position of the aircraft, a particular symbol (7) representing the aircraft, which is arranged on the y-axis (8) at a position representative of the altitude of said aircraft, and a first plot (T1) representing a theoretical flight trajectory of said aircraft in the vertical plane. Said information presentation (IF1) further includes at least one second plot (T2) corresponding to a safety altitude, and a third plot (T3) corresponding to a contour of the terrain (10) in the vertical plane.

14 Claims, 3 Drawing Sheets

Figure 1:
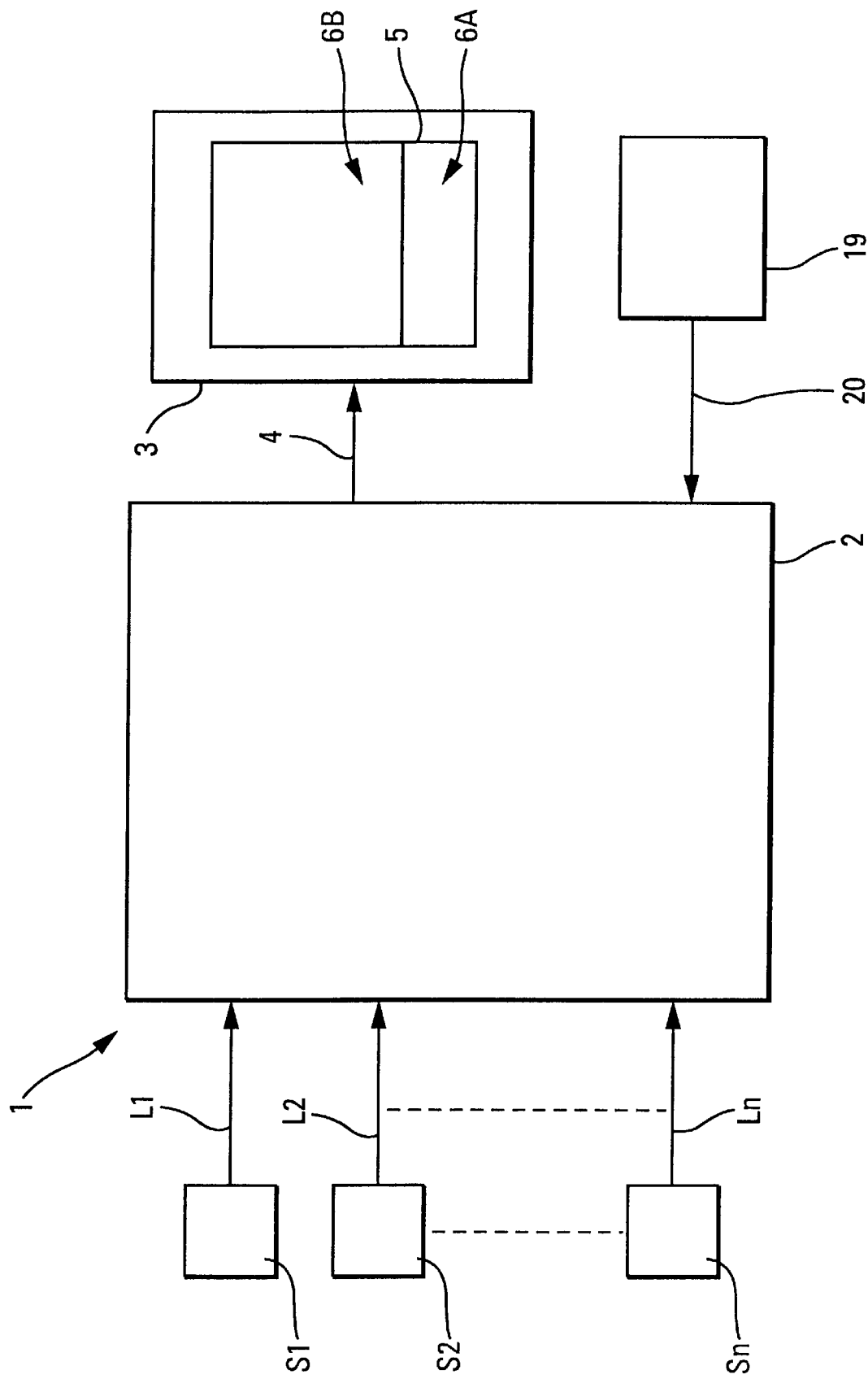

METHOD AND DEVICE FOR ASSISTANCE WITH THE PILOTING OF AN AIRCRAFT, ESPECIALLY A TRANSPORT AIRPLANE

The present invention relates to a method and a device for assistance with the piloting of an aircraft, especially of a transport airplane.

From the patent FR-2 689 231, a method is known for assistance with piloting, according to which an information presentation which represents at least one vertical plane along a flight plan of said aircraft is presented on at least one visual-display screen of an aircraft, and which includes:

- an axis system, in which a y-axis is graduated in altitude, and an x-axis is graduated in distance from the position of the aircraft;
- a particular symbol representing the aircraft, which is arranged on said y-axis at a position representative of the altitude of said aircraft; and
- a plot representing a datum trajectory which the aircraft has to follow in said vertical plane.

Said plot is formed from a plurality of straight-line segments joining waypoints together. Moreover, at said waypoints, altitude-constraint symbols are provided, which indicate a maximum altitude and/or a minimum altitude which the aircraft has to comply with when it arrives at said waypoints.

However, these altitude-constraint symbols, which are formed by small triangles, do not present the real situation in a meaningful and easily readable way. Moreover, such a presentation may be a source of errors. For example, if a datum altitude varies greatly a little upstream (or downstream) of a waypoint, a pilot of the aircraft can be induced into error by thinking that the datum altitude which is visually displayed at said waypoint is also confirmed upstream (or downstream) of it.

Moreover, from the patent FR-2 744 525, there is known an assistance method of the same type as that quoted above. However, according to this known method, the x-axis is not graduated in distance, but in time, and the time axis is scrolled so as to maintain, at a fixed position on the visual-display screen, an x-coordinate representing the time at the instant of the display.

The present invention relates to a method for assistance with the piloting of an aircraft, making it possible to remedy the abovementioned drawbacks.

To that end, said method, according to which a first information presentation which represents at least one. vertical plane along a theoretical flight trajectory of said aircraft is presented on at least one visual-display screen of said aircraft, and which includes:

- an axis system, in which a y-axis is graduated in altitude, and an x-axis is graduated in distance from the position of the aircraft;
- a particular symbol representing the aircraft, which is arranged on said y-axis at a position representative of the altitude of said aircraft; and
- a first plot representing a theoretical flight trajectory of said aircraft in said vertical plane, is noteworthy, according to the invention, in that said first information presentation further includes:
- at least one second plot corresponding to a safety altitude; and
- a third plot corresponding to a contour of the terrain in said vertical plane.

Thus, by virtue of the invention, the pilot is provided with an easily comprehensible and readable presentation of the vertical situation (position and trajectory) of the aircraft, with respect to synthetic obstacles (safety altitude) and real obstacles (terrain), and this is done throughout the flight (even if, at a given instant, the entire flight path remaining to be traveled may not be visible on the screen, for reasons of space available on said screen). It is thus possible to adapt the trajectory of the aircraft to these various obstacles, and to do so well upstream of a potential problem area. This obviously makes it possible to increase the safety of the flight.

Moreover, by virtue of the invention, the abovementioned important information (theoretical flight trajectory, safety altitude, contour of the terrain) is represented by way of the same type of graphics (namely a plot), which facilitates reading them and simplifies the monitoring of the situation of the aircraft.

It is known that different types of safety altitude are available, on the basis of the sources of information which define these altitudes, certain sources, especially those for which analysis is limited to reduced areas, being more appropriate than others.

Advantageously, said first information presentation further includes a fourth plot corresponding to a vertical section of a weather image originating from a radar.

In the context of the present invention, the various plots can be considered not only in a vertical plane (zero "thickness"), but also in a vertical strip of thickness adapted to the navigation accuracy required [for example RNP (Required Navigation Performance)].

According to the invention, in order to improve the presentation of the safety altitude, the safety-altitude values used to form said second plot originate from at least two different information sources, and the values from one or from the other of said information sources are used, depending on the phase of flight of the aircraft and of the trajectory followed.

For preference:

- when the aircraft finds itself outside a predefined route, the safety-altitude values used for all the phases of flight originate from an information source defining sector-based safety altitudes over quadrangular sectors, preferably of the MORA (Minimum Off Route Altitude) type, except for the approach phase, for which the safety-altitude values used are those originating from an information source defining sector-based safety altitudes over circular sectors, preferably of the MSA (Minimum Safe Altitude) type; and/or
- when the aircraft finds itself on a predefined route, the safety-altitude values used are those originating from an information source defining the route safety altitudes.

Furthermore, advantageously, if said second plot goes outside said first information presentation by reason of the scale chosen for the y-axis, the numerical value of the safety altitude is indicated on said first information presentation.

Moreover, in order to improve the abovementioned monitoring of the situation of the aircraft with respect to the various obstacles (synthetic and real), advantageously:

- a first warning symbol is presented on said first information presentation when the theoretical trajectory of the aircraft, with respect to said second plot (safety altitude), is not in accordance with predefined stipulations, for example when it is too close to a safety altitude or passes (downward) through such a safety altitude; and/or
- a second warning symbol is presented on said first information presentation when the theoretical trajectory of the aircraft, with respect to said third plot (contour of the terrain), is not in accordance with predefined stipulations, in particular when it is too close to the terrain.

In the context of the present invention, the contour of the terrain can be represented by different types of plots, such as inclined segments or smoothed curves, for example. However, for preference, the terrain is represented, on said first information presentation, by a series of adjacent rectangles making it possible to form said third plot.

In one preferred embodiment, said visual-display screen, preferably an ND (Navigation Display) navigation screen, includes at least two visual-display windows, of which a first window comprises said first information presentation and a second window comprises a second information presentation which, among other things, includes a plot representing a theoretical flight trajectory of the aircraft in a horizontal plane.

Advantageously, the scale of the x-axis and, for at least some scale values, the scale of the y-axis of said first information presentation depend on the scale of said second information presentation. For preference, these axis scales are proportional to the scale of said second information presentation.

The present invention also relates to a device for assistance with the piloting of an aircraft, of the type including at least:
 a plurality of information sources;
 an information acquisition and processing unit, which is linked to said information sources; and
 display means linked to said information acquisition and processing unit and presenting, on at least one visual-display screen, a first information presentation which represents at least one vertical plane along a theoretical flight trajectory of said aircraft and which includes:
  an axis system, in which a y-axis is graduated in altitude, and an x-axis is graduated in distance from the position of the aircraft;
  a particular symbol representing the aircraft, which is arranged on said y-axis at a position representative of the altitude of said aircraft; and
  a first plot representing a theoretical flight trajectory of said aircraft in said vertical plane.

According to the invention, said assistance device is noteworthy in that said display means are formed in such a way as to present, moreover, on said visual-display screen, at the level of said first information presentation:
 at least one second plot corresponding to a safety altitude; and
 a third plot corresponding to a contour of the terrain in said vertical plane.

Advantageously, said assistance device further includes means capable of being actuated by an operator and allowing the latter to amend information taken into account by the information acquisition and processing unit.

The figures of the attached drawing will give a good understanding of how the invention can be implemented. In these figures, identical references designate similar elements.

FIG. 1 is the block diagram of an assistance device in accordance with the invention.

Figure 2:
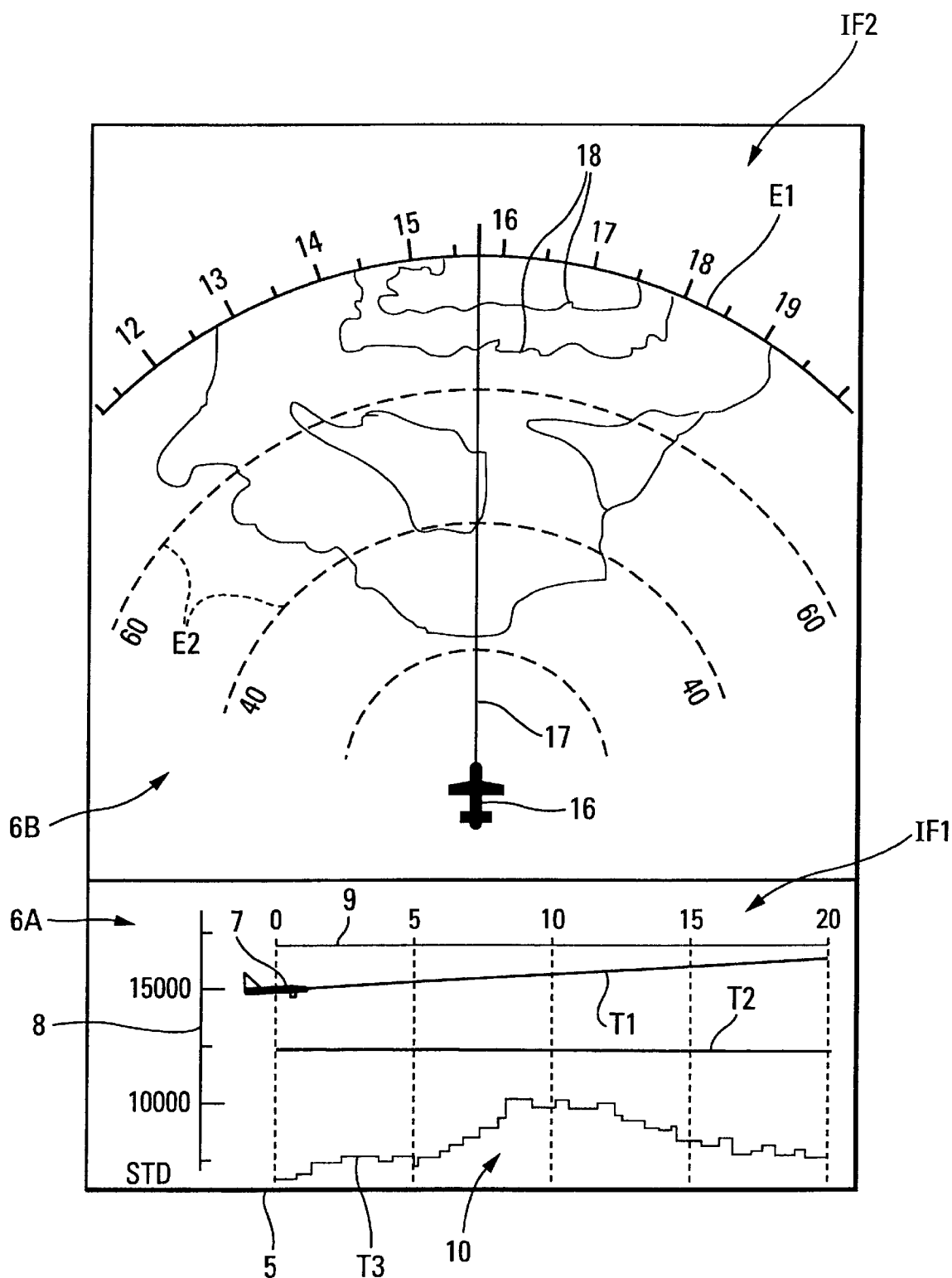

FIG. 2 diagrammatically shows a visual-display screen of an assistance device in accordance with the invention.

Figure 3:
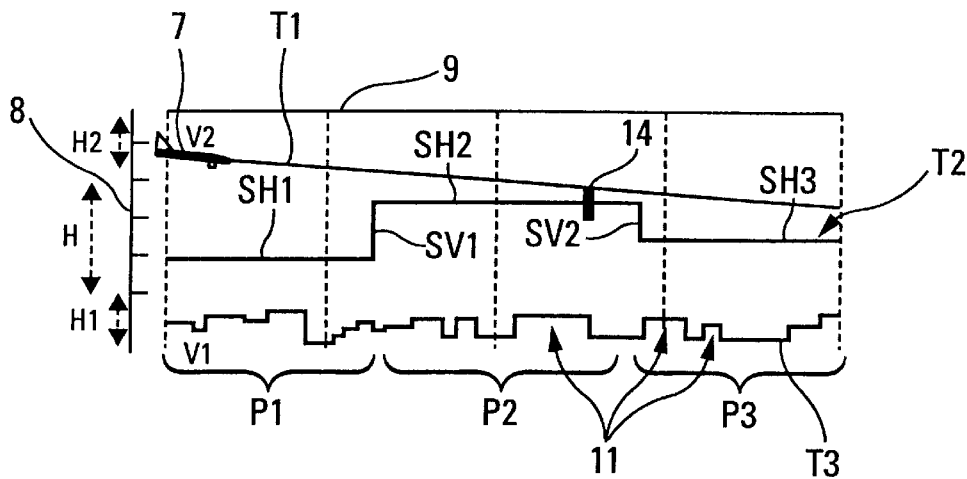

FIG. 3 shows an information presentation making it possible to have a good understanding of the implementation of the method according to the invention.

Figure 4:
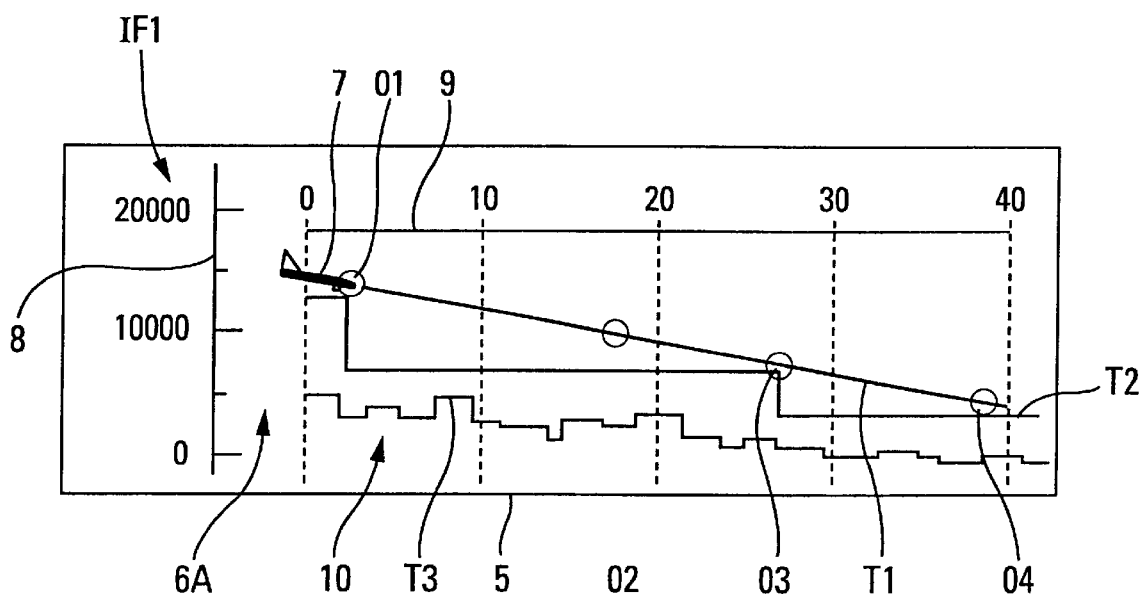

FIG. 4 diagrammatically shows the lower window of the visual-display screen of FIG. 2, in a different situation (position and trajectory) of the aircraft.

The device 1 in accordance with the invention, and represented diagrammatically in FIG. 1, is intended to assist operators (pilot, copilot, etc) of an aircraft when piloting said aircraft, for example a civil transport airplane, not represented.

Said device 1, which is installed on board the aircraft, is of the known type including:
 a (central) information acquisition and processing unit 2, for example a flight management system (FMS);
 a plurality of known information sources S1 to Sn, such as navigation instruments and sensors giving information on the state and the position of the aircraft for example, which are linked by way of links L1 to Ln to said unit 2; and
 display means 3 which are linked, by way of a link 4, to the unit 2 and which include a visual-display screen 5. Said screen 5, according to the invention, comprises two superimposed visual-display windows 6A and 6B, as shown in FIG. 2.

Said display means 3 present, in the usual way, on the window 6A of the screen 5, as represented in FIG. 2, a first information presentation IF1 which represents at least one vertical plane along a (theoretical) flight trajectory of said aircraft represented by a particular symbol 7 and which includes:
 an axis system, in which a y-axis 8 is graduated in altitude, preferably expressed in feet (one foot being equal to about 0.3 meter), and an x-axis 9 which is graduated in distance from the position of the aircraft 7, preferably expressed in nautical miles NM (one nautical mile being equal to about 1852 meters);
 said particular symbol 7 representing the aircraft, which is represented on said y-axis 8 at a position representative of the altitude of said aircraft; and
 a plot T1 representing a theoretical flight trajectory of said aircraft in said vertical plane, as detailed below.

According to the invention, said display means 3 are formed in such a way as to present, moreover, as appropriate, on said window 6A of said visual-display screen 5, at the level of said first information presentation IF1:
 at least one plot T2, preferably a continuous line, for example in magenta, corresponding to a safety altitude; and
 a plot T3 corresponding to a contour of the terrain 10 in said vertical plane.

Said display means 3 can also present a plot, not represented, corresponding to a vertical section of a weather image originating from a radar.

Moreover, according to the invention:
 the symbol 7 is situated at the barometric altitude which is used by the crew and which, in the usual way, is indicated on the primary piloting screen PFD (Primary Flight Display), not represented, and linked to the computer 2, for example. This symbol 7 is inclined according to the flight angle FPA (Flight Path Angle). An indication QNH is also provided (corresponding to the atmospheric pressure above sea level) or an STD indication (corresponding to the standard altitude measurement), depending on the barometric configuration used for this purpose, namely the STD indication in the example of FIG. 2;
 the plot T1 is preferably formed by a green plot, which can be continuous or in broken line (that is to say with dashes), depending on the navigation mode used, as will be seen in more detail below. Two different plots (continuous and in broken line) can also be presented simultaneously. A plot in broken line corresponds to the theoretical trajectory of the aircraft (if it is available), while the plot T1 in continuous line (represented in FIG. 2, for example) corresponds to the real trajectory followed by the aircraft if it keeps to the flight characteristics (slope, etc) as they exist at the present instant, along the flight angle FPA;

the window 6A is divided into three horizontal bands represented diagrammatically in FIG. 3, namely:
- a lower margin H1;
- an upper margin H2; and
- a region of maneuver H of the symbol 7 of the aircraft; and the terrain 10 is formed by a plurality of rectangles 11 represented in particular in FIG. 3, the x-axis of each of said rectangles 11 being equal to the horizontal distance along the flight trajectory of the aircraft. Said terrain 10 exhibits a color (for example brown) which is different from the color (for example black or gray) of the bottom of the zone H, which makes it possible to highlight the plot T3 of terrain contour.

FIG. 2 illustrates an aircraft-climbing situation, and FIGS. 3 and 4 a descending situation [with visual display (by circles) of waypoints O1, O2, O3, O4 of the flight plan of the aircraft in FIG. 4].

It will be noted that, in the context of the present invention, the display in the vertical plane may also correspond to the trajectory anticipated according to the flight plan (possibility of turning in the horizontal plane at the waypoints) and not solely to the straight track in front of the aircraft at a given instant. The safety altitudes and the contour of the terrain which are displayed therefore correspond to the trajectory which the aircraft will follow if the flight plan is not altered.

Hence, by virtue of the invention, the pilot is provided with an easily comprehensible and legible presentation of the situation (position, trajectory) (vertical flight plan) of the aircraft in a vertical plane, with respect to synthetic obstacles (safety altitude T2) and real obstacles (terrain 10), and this is so throughout the entire flight (even if, at a given instant, the flight path remaining to be covered is not necessarily visible entirely on the screen 5, for reasons of space available on said screen 5). The pilot can thus adapt the trajectory of the aircraft to these obstacles, even upstream of a possible problem area. This makes it possible to increase the safety of the flight.

Moreover, by virtue of the invention, the abovementioned important information (theoretical flight trajectory T1, safety altitude T2, contour of the terrain T3) is represented by way of the same type of graphics (namely a plot), which facilitates their reading and simplifies the monitoring of the situation of the aircraft.

In the context of the present invention, the trajectory T1 may correspond:
- to a datum trajectory with waypoints; and/or
- to a trajectory inclined according to the flight angle FPA. Moreover, in this case, if a datum altitude is indicated in the automatic pilot, the trajectory ceases its inclination when it reaches this datum altitude and then remains horizontal.

Furthermore, in order to alert the operator when the trajectory T1 of the aircraft comes too close to one of the plots T2 and T3, the display means 3 present, on the window 6A of the screen:

- a warning symbol, not represented, for example a red vertical line, which indicates that the position of the trajectory T1 of the aircraft, with respect to that of the plot T3, is not in accordance with predefined stipulations, that is to say the trajectory T1 is reaching the point at which this warning symbol is situated a minimum allowable height above the terrain 10; and
- a warning symbol 14, for example a red vertical line, represented diagrammatically in FIG. 3, which indicates that the position of the trajectory T1 (not represented in FIG. 3) of the aircraft, with respect to that of the plot T3, is not in accordance with predefined stipulations.

In one preferred embodiment, the warning symbol 14 is presented if:
- the predicted position—having regard to the modes engaged—is under the safety altitude (selected altitude less than the safety altitude intercepted if the automatic pilot is engaged); or if
- the altitude of the aircraft is less than that of the current safety altitude.

In the case of the predicted position, the prediction will preferably be limited to one minute of flight.

This presentation of the warning symbol 14 is inhibited:
- during the initial takeoff phase. The function becomes active above the first safety altitude crossed; and
- in approach phase, once the safety altitude has been crossed (downward). It is determined whether the approach phase has been entered, having regard to the piloting modes engaged.

Furthermore, according to the invention, the values of safety altitude used to form said second plot T2 originate from at least two different information sources S1 to Sp for example (p being less than n), and the values from one or from the other of said information sources S1 to Sp are used, depending on the phase of flight of the aircraft, as illustrated in FIG. 3. In this FIG. 3, during phases of flight P1, P2 and P3, the safety altitudes used take values A1, A2 and A3 respectively, illustrated by horizontal segments SH1, SH2, SH3 situated at said values A1, A2 and A3, not represented.

Hence, by way of illustration, the value A1 may originate from a first information source, the value A2 from a second information source, and the value A3 from a third information source or from said first information source.

The plot T2, in addition to said horizontal segments SH1 to SH3, includes vertical segments SV1 and SV2 linking together these horizontal segments SH1 to SH3.

If a plot T2 of a safety altitude is not visible in the visual-display field H, because it lies at a value which is not indicated on the y-axis 8 which is displayed (it has gone out of the top or of the bottom of the visual-display field), its numerical value is displayed:
- either at the level of the margin H1, if the value of the safety altitude is below the displayed values of the axis 8, as represented for a value V1 in FIG. 3;
- or at the level of the margin H2, if the value is higher than those displayed of the axis 8, as illustrated for a value V2.

In the context of the present invention, two known types of safety altitudes can be taken into account, namely:
- sector-based safety altitudes, which are valid over a zone of terrain; and
- route safety altitudes, which are related to a particular (flight) route.

The sector-based safety altitudes are applicable when not on a predefined route, which is known and followed by the flight-management computer FMS. These are defined on:

circular sectors, in the case of MSA (Minimum Safe Altitude) altitudes, lying at a distance<25 NM (nautical miles) from a reference radio means; or quadrangular sectors (40 NM×40 NM) in the case of MORA (Minimum Off Route Altitude) altitudes.

The MORA altitudes are applied by default. They are replaced by the MSA altitude at the approach to the destination.

Moreover, the safety altitudes on a route are operational minima to be complied with over particular segments and at particular points of a published trajectory. According to the invention, use will be made of:

either, if it is available, a data table corresponding to the published trajectory;

or the data corresponding to the sectors overflown.

Furthermore, according to the invention, the abovementioned window GA may be a visual-display zone (complete or partial) of different types of visual-display screen, especially of a screen which is designed specifically for implementing the present invention, or of a known primary piloting screen PFD (Primary Flight Display).

However, in one preferred embodiment, the screen 5 is an ND (Navigation Display) navigation screen which includes the two windows 6A and 6B, the window 6A comprising the abovementioned information presentation IF1 in accordance with the invention, and the window 6B comprising an information presentation IF2 represented diagrammatically in FIG. 2.

This information presentation IF2 which corresponds to a normal presentation on an ND screen illustrates the situation of the aircraft (lateral flight plan) in a horizontal plane and includes:

a symbol 16, illustrating the position of the aircraft;

a plot 17 showing the theoretical flight trajectory of the aircraft in the horizontal plane, as specified below, on the basis of the navigation and guidance modes;

a normal graduation E1 in angular offsets;

a normal graduation E2 in distances; and plots 18 diagrammatically illustrating a radar image or an image of the terrain.

The information presentation IF2 can be represented according to different modes, widely known by the titles ARC, ROSE and PLAN. The display of the information presentation IF1 is carried out in accordance with these various modes: distance displayed in front of the aircraft (thus scale of the x-axis of the presentation IF1). Moreover, in PLAN mode, simultaneous scrolling of the flight plan is performed on the presentations IF1 and IF2.

Furthermore, the device 1 in accordance with the invention further includes means 19 (for example a screen and/or a set of control elements such as rotary knobs or push buttons) which are linked via a link 20 to the unit 2 and which are capable of being actuated by an operator, and allow the latter to amend the information taken into account by said information acquisition and processing unit 2, and in particular the scales of said graduations E1 and E2.

According to the invention:

the scale of the x-axis 9 depends on (is preferably proportional to) the scale of the graduations E1 and E2; and the scale of the y-axis 8 depends on (is preferably proportional to) the scale of the graduations E1 and E2 up to a predefined scale value, and is constant beyond this predefined scale value.

Furthermore, the principle of visual display in accordance with the invention of the trajectory of the aircraft, on the basis of the navigation and guidance modes, is presented below.

It will be noted that, on the ground, the flight plan is visually displayed on the information presentations IF1 and IF2 by a continuous plot in green, as well as the associated information along the flight plan.

I—When the automatic pilot is turned on

A. At takeoff if the SRS (Speed Reference System) system [SRS below] is engaged:

if the RWY (Runway) system [RWY below] is engaged [the LOC (Localizer) signal is followed] up to 30 feet:

if the NAV navigation mode is armed [NAV below] (NAV is engaged at 30 feet):

if the CLB (climb) mode [CLB below] is armed:

in the window 6B, the active lateral flight plan is visually displayed, for example by a continuous plot in green, in the window 6A, the active vertical flight plan is visually displayed, for example by a continuous plot in green, with the speed vector and the associated constraints, terrain=profile along the lateral flight plan, safety altitude=MORA profile along the lateral flight plan, if CLB not armed:

in the window 6B, the active lateral flight plan is visually displayed, for example by a continuous plot (in green), in the window 6A, the vertical flight plan is visually displayed by a dashed-line plot (in green), and the selected vertical trajectory by a continuous plot (in green), terrain=profile along the lateral flight plan, safety altitude=MORA, if NAV not armed (no flight plan): RWY TRK [Track (Angle)] is engaged at 30 feet:

in the window 6B, the "line of flight" (track line) is visually displayed, by a continuous plot (in green), in the window 6A, the selected vertical trajectory is visually displayed by a continuous plot (in green), terrain=profile along the lateral flight plan, safety altitude=MORA if RWY not engaged (no LOC to be followed)

no difference with RWY engaged, if SRS not engaged [no V2 (Take Off Safety Speed) or incorrect takeoff configuration]:

if NAV armed then engaged, see above, if NAV not armed, see above.

B. After takeoff: if the flight-management computer FMS (Flight Management System) [FMS below] is managing the trajectory laterally (NAV mode)

if the FMS is managing the trajectory vertically (CLIMB mode):

in the window 6B, the active lateral flight plan is visually displayed, by a continuous plot (in green), in the window 6A, the active vertical flight plan is visually displayed, by a continuous plot (in green), and the speed vector, terrain=profile along the lateral flight plan, safety altitude=MORA, if the FMS is not managing the trajectory vertically (known as OPEN CLIMB mode):

in the window 6B, the active lateral flight plan is visually displayed, by a continuous plot (in green), in the window 6A, the vertical flight plan is visually displayed, by a plot with dashes (in green) (not active), with the selected vertical trajectory displayed by a continuous plot (in green),
terrain=profile along the lateral flight plan,
safety altitude=MORA.

C. After takeoff: if lateral navigation is done in selected mode
in the window 6B, the flight plan is visually displayed by a plot (in green) with dashes, and the line of flight (track line) by a continuous plot (in green),
in the window 6A, the selected vertical trajectory is visually displayed by a continuous plot (in green),
terrain=profile along the instantaneous flight line (track line),
safety altitude=MORA.

D. On the approach, based on NAV
if approach with an ILS (Instrument Landing System) [ILS below]:
same visual display as NAV (flight plan by a continuous plot in the window 6B),
if not ILS approach:
same visual display as NAV [flight plan by a continuous plot (in green) in the window 6B].

E. On the approach based on HDG/TRK (Heading/Track)
if ILS approach:
visual display=NAV,
if not ILS approach:
visual display=line of flight (track line).

F. Upon overshooting: TOGA (Take Off/Go Around) in descent phase
Visual display of the overshoot trajectory: for example in blue on the basis of the selection of the approach mode APPR (Approach):
window 6A: if it is possible to develop it, the overshoot trajectory is represented in the continuity of the approach,
otherwise: the decision point is physically represented in blue with a symbol representing an arrow in dashed lines (in blue) directed upward,
Visual display during the transition in GA TRK (Go Around, Track) mode:
window 6B: the flight plan is visually displayed, and becomes a plot with dashes (in green), and the line of flight (track line) is displayed,
After engagement of NAV: see above
Flight plan: a continuous plot (in green)
After engagement of HDG: see above.

II—When the automatic pilot is turned off and the DV (flight director) device is turned on
A. If the FMS (NAV, LOC) mode remains engaged and displayed on the FMA (Flight Mode Annunciator)
if the FMS is managing the trajectory vertically (DES, CLB, etc, mode remains displayed):
in the window 6B, the active lateral flight plan is visually displayed by a continuous plot (in green),
in the window 6A, there is displayed:
if a predefined condition is satisfied (if Cross Track Error <tbd NM), the active vertical flight plan by a continuous plot (in green), and the speed vector,
otherwise [if Cross Track Error>tbd NM (the crew moves away from the flight plan by piloting with the stick)], the speed vector and the local environment,
if the FMS is not managing the vertical trajectory—in this case, the commands from the FCU (Flight Control Unit) are retransmitted to the DV:
in the window 6B, the active lateral flight plan is visually displayed by a continuous plot (in green),
in the window 6A, there is displayed:
if a predefined condition is satisfied (if Cross Track Error<tbd NM), the active vertical flight plan by a plot (in green) with dashes, and the selected vertical trajectory by a continuous plot (in green), without taking into account the selected altitude,
otherwise (if Cross Track Error>tbd NM), the speed vector and the local environment.

B. If lateral navigation is done in selected mode (HDG/TRK)—in this case, the FCU (Flight Control Unit) commands are retransmitted to the DV
in the window 6B, the flight plan is visually displayed by a plot (in green) with dashes, and the line of flight (track line) by a continuous plot (in green),
in the window 6A, the selected vertical trajectory is visually displayed by a continuous plot (in green), without taking into account the selected altitude.

III—When the automatic pilot is turned off and the DV device is turned off the NAV mode trips:
in the window 6B, the lateral flight plan is visually displayed by a plot (in green) with dashes, and the line of flight (track line) by a continuous plot (in green),
in the window 6A, the selected vertical trajectory is visually displayed by a continuous plot (in green), without taking into account the selected altitude.

What is claimed is:

1. A method for assistance with piloting of an aircraft, according to which a first information presentation which represents at least one vertical plane along a theoretical flight trajectory of said aircraft is presented on at least one visual-display screen of said aircraft, and which includes:
an axis system, in which a y-axis is graduated in altitude, and an x-axis is graduated in distance from the position of the aircraft;
a particular symbol representing the aircraft, which is arranged on said y-axis at a position representative of the altitude of said aircraft;
a first plot representing a theoretical flight trajectory of said aircraft in said vertical plane; and
a third plot corresponding to a contour of the terrain in said vertical plane, wherein said first information presentation further includes at least one second plot corresponding to a safety altitude.

2. The method as claimed in claim 1, wherein the safety-altitude values used to form said second plot originate from at least two different information sources, and the values from one or from the other of said at least two different information sources are used, depending on the phase of flight of the aircraft and of the trajectory followed.

3. The method as claimed in claim 2, wherein, when the aircraft finds itself outside a predefined route, the safety-altitude values used originate from an information source defining sector-based safety altitudes over quadrangular sectors for all the phases of flight, except for the approach phase, for which the safety-altitude values used are those originating from an information source defining sector-based safety altitudes over circular sectors.

4. The method as claimed in claim 2, wherein, when the aircraft finds itself on a predefined route, the safety-altitude values used are those originating from an information source defining the route safety altitudes.

5. The method as claimed in claim 1, wherein said first information presentation further includes a fourth plot corresponding to a vertical section of a weather image originating from a radar.

6. The method as claimed in claim 1, wherein, if said second plot goes outside said first information presentation by reason of the scale chosen for the y-axis, the numerical value of the safety altitude is indicated on said first information presentation.

7. The method as claimed in claim 1, wherein a first warning symbol is presented on said first information presentation when the theoretical trajectory of the aircraft, with respect to said second plot, is not in accordance with predefined stipulations.

8. The method as claimed in claim 1, wherein a second warning symbol is presented on said first information presentation when the theoretical trajectory of the aircraft, with respect to said third plot, is not in accordance with predefined stipulations.

9. The method as claimed in claim 1, wherein the terrain is represented, on said first information presentation, by a series of adjacent rectangles making it possible to form said third plot.

10. The method as claimed in claim 1, wherein said at least one visual-display screen includes at least two visual-display windows, of which a first window comprises said first information presentation and a second window comprises a second information presentation which includes a plot representing a theoretical flight trajectory of the aircraft in a horizontal plane.

11. The method as claimed in claim 10, wherein the scale of the x-axis and, for at least some scale values, the scale of the y-axis of said first information presentation depend on the scale of said second information presentation.

12. A device for assistance with piloting of an aircraft, said device including at least:
- a plurality of information sources;
- an information acquisition and processing unit, which is linked to said information sources; and
- display means linked to said information acquisition and processing unit and presenting, on at least one visual-display screen, a first information presentation which represents at least one vertical plane along a theoretical flight trajectory of said aircraft and which includes:
  - an axis system, in which a y-axis is graduated in altitude, and an x-axis is graduated in distance from the position of the aircraft;
  - a particular symbol representing the aircraft, which is arranged on said y-axis at a position representative of the altitude of said aircraft;
  - a first plot representing a theoretical flight trajectory of said aircraft in said vertical plane, and
  - a third plot corresponding to a contour of the terrain in said vertical plane, wherein said display means are formed in such a way as to present, moreover, on said at least one visual-display screen, at the level of said first information presentation, at least one second plot corresponding to a safety altitude.

13. The device as claimed in claim 12, which further includes means capable of being actuated by an operator and allowing the latter to amend information taken into account by the information acquisition and processing unit.

14. The device as claimed in claim 12, wherein said at least one visual-display screen includes at least two visual-display windows, of which a first window comprises said first information presentation and a second window comprises a second information presentation which includes a plot representing a theoretical flight trajectory of the aircraft in a horizontal plane.

* * * * *